US012727528B2

(12) United States Patent
Garner et al.

(10) Patent No.: US 12,727,528 B2
(45) Date of Patent: Sep. 8, 2026

(54) ROW UNIT SUSPENSION SYSTEM AND METHOD

(71) Applicant: DEERE & COMPANY, Moline, IL (US)

(72) Inventors: Elijah B. Garner, Bettendorf, IA (US); Randall A. Maro, Davenport, IA (US); Gaurav Chakraborty, Pune (IN)

(73) Assignee: Deere & Company, Moline, IL (US)

( * ) Notice: Subject to any disclaimer, the term of this patent is extended or adjusted under 35 U.S.C. 154(b) by 357 days.

(21) Appl. No.: 18/543,394

(22) Filed: Dec. 18, 2023

(65) Prior Publication Data

US 2025/0194456 A1 Jun. 19, 2025

(51) Int. Cl.
*A01C 7/20* (2006.01)

(52) U.S. Cl.
CPC .............. *A01C 7/205* (2013.01); *A01C 7/203* (2013.01)

(58) Field of Classification Search
CPC ................................ A01C 7/203; A01C 7/205
USPC ............ 172/462, 484, 624.5, 661, 663, 668; 111/52, 59, 927
See application file for complete search history.

(56) References Cited

U.S. PATENT DOCUMENTS 2,685,384 A * 8/1954 Tanke ...................... A01C 7/08 222/181.1
2,797,629 A * 7/1957 Kelley .................. A01B 13/08 172/488
3,032,903 A * 5/1962 Ede ........................ A01B 13/08 405/181
3,450,074 A * 6/1969 Doty ........................ A01C 7/18 111/135
3,454,285 A * 7/1969 Van Peursem ....... A01B 69/003 280/412
3,527,308 A * 9/1970 Cheers .................. A01B 63/10 172/699
3,552,497 A * 1/1971 Stedman ................ A01B 13/08 172/814
3,592,273 A * 7/1971 Martin .................. A01B 31/00 172/826

(Continued)

OTHER PUBLICATIONS

Extended European Search Report and Written Opinion issued in European Patent Application No. 24215742.8 dated May 6, 2025, in 11 pages.

*Primary Examiner* — Christopher J Sebesta
*Assistant Examiner* — Audrey L Lusk
(74) *Attorney, Agent, or Firm* — Taft Stettinius & Hollister LLP; Stephen F. Rost

(57) ABSTRACT

A planter for use in an agricultural operation includes a toolbar supported above an underlying surface and a row unit. The planter includes a linkage assembly pivotably coupled to and positioned between the row unit and the toolbar. The linkage assembly includes an upper arm including a forward end pivotably coupled to the toolbar and a rearward end pivotably coupled to the row unit, and a lower arm including a forward end pivotably coupled to the toolbar and a rearward end pivotably coupled to the row unit. The planter includes an actuator having a first end coupled to the row unit and a second end coupled to the lower arm. The actuator is configured to retract to urge the row unit downward relative to the underlying surface. The first end of the actuator is positioned nearer to the row unit than is the second end.

19 Claims, 5 Drawing Sheets

(56) References Cited

U.S. PATENT DOCUMENTS

| | | | | | |
|---|---|---|---|---|---|
| 3,738,432 | A * | 6/1973 | Kelley | E02F 5/32 | 37/367 |
| 4,033,417 | A * | 7/1977 | Rau | A01B 39/22 | 172/624.5 |
| 4,046,200 | A * | 9/1977 | Mullet | A01G 3/062 | 172/14 |
| 4,074,768 | A * | 2/1978 | Stedman | E02F 3/765 | 172/742 |
| 4,103,443 | A * | 8/1978 | Pelsy | E02F 5/102 | 280/460.1 |
| 4,108,089 | A * | 8/1978 | van der Lely | A01C 23/02 | 172/615 |
| 4,142,817 | A * | 3/1979 | Lazure | F16L 1/032 | 37/367 |
| 4,219,947 | A * | 9/1980 | Paladino | E02F 5/102 | 172/683 |
| 4,466,491 | A * | 8/1984 | Tower | E02F 5/32 | 172/476 |
| 5,461,995 | A * | 10/1995 | Winterton | A01C 7/006 | 111/139 |
| 5,555,824 | A * | 9/1996 | Stufflebeam | A01C 7/205 | 172/624.5 |
| 5,868,207 | A * | 2/1999 | Langbakk | A01C 7/201 | 172/321 |
| 7,111,566 | B2 * | 9/2006 | Horn | A01C 7/208 | 172/624.5 |
| 8,505,473 | B1 * | 8/2013 | Martin | A01C 7/205 | 111/926 |
| 9,027,663 | B2 * | 5/2015 | Gartenmaier | E02F 9/085 | 172/819 |
| 11,665,989 | B2 * | 6/2023 | Fanshier | A01B 63/32 | 172/4 |
| 2010/0294182 | A1 * | 11/2010 | Henry | A01C 7/203 | 111/152 |
| 2012/0060731 | A1 * | 3/2012 | Bassett | A01C 7/205 | 172/260.5 |
| 2013/0306337 | A1 * | 11/2013 | Bassett | A01B 61/044 | 172/260.5 |
| 2013/0319700 | A1 * | 12/2013 | Maschio | A01C 5/064 | 172/166 |
| 2015/0073668 | A1 * | 3/2015 | Achen | A01C 7/203 | 172/663 |
| 2015/0152623 | A1 * | 6/2015 | Yamazaki | E02F 5/32 | 172/663 |
| 2015/0351311 | A1 * | 12/2015 | Johnson | A01C 5/064 | 172/663 |
| 2022/0053688 | A1 * | 2/2022 | Mertens | A01C 7/205 | |
| 2022/0295690 | A1 * | 9/2022 | Thompson | A01B 63/22 | |
| 2023/0263085 | A1 | 8/2023 | Fanshier et al. | | |

* cited by examiner 116
12
D1
D3
54
152
46
166
144
142
140
162
68
78
82
176
80
74
148
156
112
70
184
72
50
60
58
10
64
110

ROW UNIT SUSPENSION SYSTEM AND METHOD

FIELD OF THE DISCLOSURE

The present disclosure relates to planters with row units, and more particularly, to linkage assemblies for row units of planters.

BACKGROUND OF THE DISCLOSURE

Agricultural implements such as planters often have a plurality of row units coupled to a toolbar or other frame. The plurality of row units may be pulled behind a tractor or other work machine to provide commodity to an underlying surface. As the work machine travels along the underlying surface, row units may become positioned at undesirable locations or angles relative to the underlying surface. This may be caused by the arrangement of components of the row units or components of linkage assemblies that facilitate movement of the row units relative to the toolbar, for example.

SUMMARY

In an illustrative embodiment, a planter for use in an agricultural operation includes: a toolbar supported above an underlying surface; a row unit coupled to the toolbar and configured to distribute commodity to the underlying surface; a linkage assembly including an upper arm and a lower arm positioned below the upper arm, the upper arm including a forward end pivotably coupled to the toolbar at a first coupling point and a rearward end pivotably coupled to the row unit at a third coupling point, and the lower arm including a forward end pivotably coupled to the toolbar at a second coupling point and a rearward end pivotably coupled to the row unit at a fourth coupling point; and an actuator including a first end pivotably coupled to the row unit and the upper arm at the third coupling point and a second end pivotably coupled to the lower arm at a fifth coupling point located between the second coupling point and the fourth coupling point; wherein the actuator is configured to retract to urge the row unit downward relative to the underlying surface.

In some embodiments, the actuator includes a cylinder and a piston positioned partially within the cylinder and configured to move relative to the cylinder during extension and retraction of the actuator. In some embodiments, the piston is coupled to both the row unit and the upper arm at the third coupling point and the cylinder is coupled to the lower arm at the fifth coupling point. In some embodiments, the cylinder includes a chamber having a rod-side configured to be pressurized to retract the actuator and a cylinder-side configured to be pressurized to extend the actuator; and the cylinder-side is located between the fifth coupling point and the rod-side.

In some embodiments, the upper arm and the lower arm are parallel to each other at all times during the agricultural operation. In some embodiments, the lower arm includes a longitudinal axis that extends therethrough and is aligned with the second coupling point and the fourth coupling point.

In some embodiments, a majority of a length of the lower arm is symmetrical across opposite sides of the longitudinal axis. In some embodiments, the longitudinal axis is aligned with the fifth coupling point. In some embodiments, the longitudinal axis is not aligned with the fifth coupling point. In some embodiments, the fifth coupling point is positioned below the longitudinal axis.

In some embodiments, the lower arm includes a standard portion extending below the longitudinal axis a first distance and a bumper portion adjacent to the standard portion and extending below the longitudinal axis a second distance that is greater than the first distance; and the bumper portion is configured to contact the row unit to limit pivoting movement of the row unit relative to the linkage assembly. In some embodiments, the fifth coupling point is located on the bumper portion. In some embodiments, the fifth coupling point is positioned nearer to the fourth coupling point than to the second coupling point.

In some embodiments, the row unit includes a main frame to which the linkage assembly is coupled; and the row unit includes at least one disk coupled the main frame and configured to form a furrow in the underlying surface that receives the commodity distributed by the row unit.

In some embodiments, the actuator is configured to extend to urge the row unit upward away from the underlying surface into a position for travel independent of the agricultural operation. In some embodiments, the force available to extend the actuator is greater than the force available to retract the actuator. In some embodiments, the force required and used to extend the actuator to move the row unit into a position for travel independent of the agricultural operation is greater than the force required and used to retract the actuator.

In another illustrative embodiment, a planter for use in an agricultural operation includes: a toolbar supported above an underlying surface; a row unit coupled to the toolbar and configured to distribute commodity to the underlying surface; a linkage assembly including an upper arm and a lower arm positioned below the upper arm, the upper arm including a forward end pivotably coupled to the toolbar at a first coupling point and a rearward end pivotably coupled to the row unit at a third coupling point, and the lower arm including a forward end pivotably coupled to the toolbar at a second coupling point and a rearward end pivotably coupled to the row unit at a fourth coupling point; and an actuator including a first end pivotably coupled to the row unit and a second end pivotably coupled to the lower arm at a fifth coupling point located between the second coupling point and the fourth coupling point; wherein the actuator is configured to retract to urge the row unit downward relative to the underlying surface.

In some embodiments, the first end of the actuator is pivotably coupled to the upper arm. In some embodiments, the first end of the actuator is not pivotably coupled to the upper arm. In some embodiments, the first end of the actuator is coupled to the row unit at a location spaced apart from the third coupling point. In some embodiments, the first end of the actuator is pivotably coupled to the row unit at a location that is between the third coupling point and the fourth coupling point. In some embodiments, the first end of the actuator is pivotably coupled to the row unit at a location that is nearer to the third coupling point than to the fourth coupling point.

In another illustrative embodiment, a method of moving a row unit that is configured to distribute commodity during an agricultural operation includes: moving a planter having a toolbar over underlying soil during the agricultural operation such that a linkage assembly coupled between the toolbar and the row unit pivots relative to the toolbar and the row unit; retracting an actuator to urge the row unit downward relative to the underlying surface, the actuator including: a first end pivotably coupled to the row unit and the upper arm at a coupling point where the row unit is pivotably coupled to the upper arm, and a second end pivotably coupled to the lower arm at a coupling point located between the row unit and the toolbar; and extending the actuator to urge the row unit upward away from the underlying surface to move the row unit into a position for travel independent of the agricultural operation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views.

DETAILED DESCRIPTION

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

Figure 1:
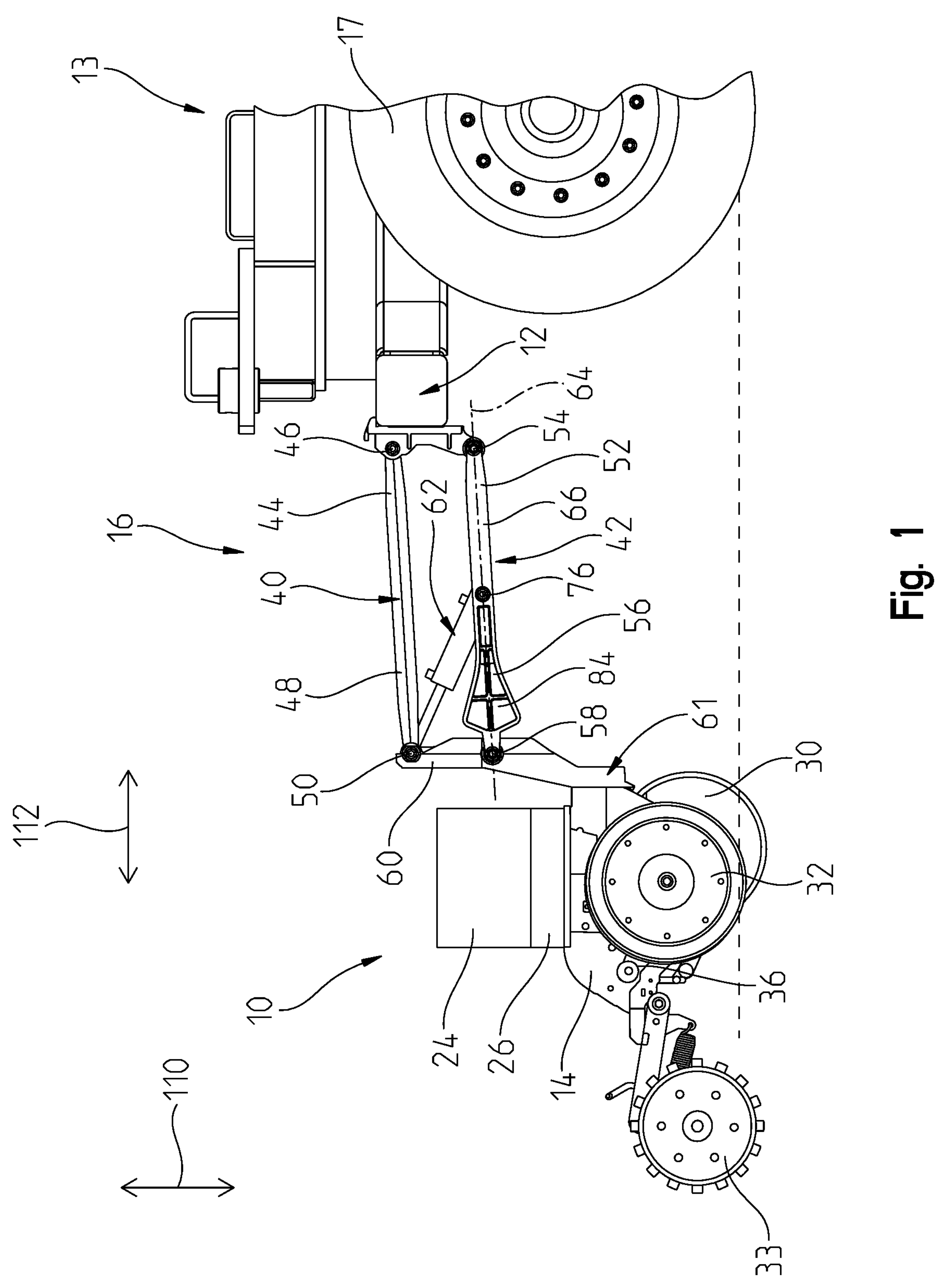
FIG. 1 is a side elevation view of a row unit moveably coupled to a toolbar of a planter via a linkage assembly such that the row unit is configured to follow ground contours of an underlying surface during an agricultural operation.

FIG. 1 illustrates a planter 13 including a row unit 10 and a toolbar 12 to which the row unit 10 is indirectly coupled. The row unit 10 is configured to deliver commodity to an underlying surface. In some embodiments, the planter 13 includes a plurality of row units mounted along a length of the toolbar 12. In some embodiments, the planter 13 includes multiple toolbars (e.g., a forward toolbar and a rearward toolbar) spaced from one another in the fore-aft direction, each having row units coupled thereto. The fore-aft direction is shown by the arrow 112 in FIG. 1. It should be appreciated that reference to the row unit 10 is applicable to each row unit of the planter 13 regardless of the number or specific arrangement of the row units on the planter 13. In the illustrative embodiment, the toolbar 12 is supported above the underlying surface by a plurality of wheels, one of which (i.e., wheel 17) is shown in FIG. 1.

Figure 5:
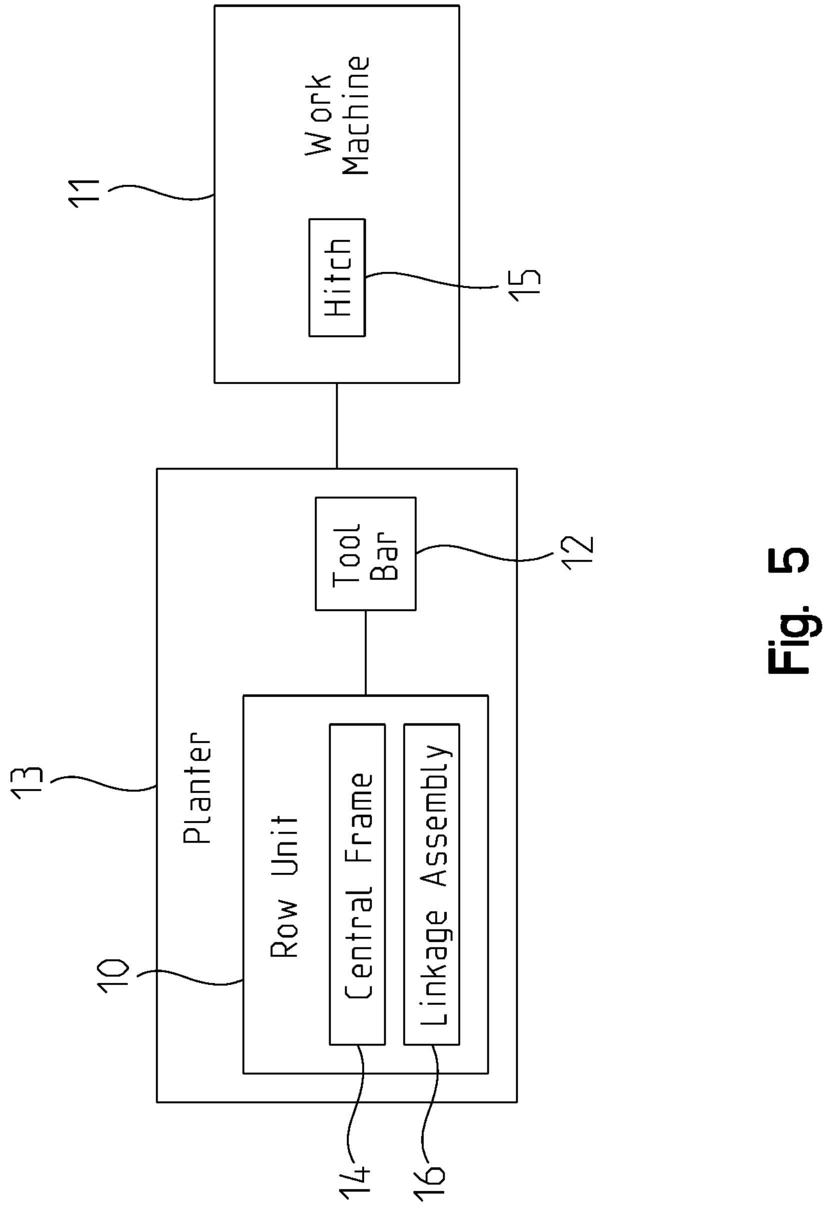
FIG. 5 is a diagrammatic view of the planter of FIG. 1 and a work machine that is configured to move the planter along the underlying surface during the agricultural operation.

As shown in FIG. 5, in the illustrative embodiment, the planter 13 is coupled to a work machine 11, such as a tractor, via a hitch 15. In some embodiments, the work machine 11 includes a power unit such as a gas, diesel, or electric motor or a hybrid combination thereof that selectively distributes torque to move one or more wheels or a track assembly of the work machine 11. The hitch 15 provides a location to couple the planter 13 to a frame of the work machine 11. In this arrangement, the work machine 11 is configured to pull the planter 13 along the underlying surface. The hitch 15 may have a single or multi-point coupling configuration. In some embodiments, the row unit 10 may be coupled directly to a toolbar, the frame of the work machine 11, or another portion of the work machine 11 with or without the hitch 15. The embodiments of the planter 13 and work machine 11 described herein are non-limiting examples suitable for use with the row unit 10, and it should be appreciated that the row unit 10 may be used with any planter and/or work machine suitable for advancing the row unit 10 along an underlying surface during an agricultural operation.

Referring again to FIG. 1, in the illustrative embodiment, the row unit 10 includes a main frame 61 coupled to the toolbar 12 by a linkage assembly 16. The linkage assembly 16 enables vertical (i.e., the direction indicated by the arrow 110) movement of the row unit 10 relative to the toolbar 12. The linkage assembly 16 is positioned between and pivotably coupled to the toolbar 12 and the row unit 10 such that the row unit 10 is configured to move vertically relative to the toolbar 12 to follow the contours of the underlying surface during an agricultural operation.

In some embodiments (e.g., FIGS. 3-4), the linkage assembly 16 is replaced by a linkage assembly 116. The linkage assembly 116 is similar to the linkage assembly 16 such that description of one applies equally to the other unless otherwise stated. The length of the linkage assembly 116 (in the fore-aft direction 112) is less than that of the linkage assembly 116. Based at least in part on the lesser length of the linkage assembly 116, an actuator 162 associated with the linkage assembly 116 is arranged differently (e.g., relative to the corresponding lower arm 142) than an actuator 62 of the linkage assembly 16. Further, the linkage assembly 16 includes a lower arm 42 that differs from a lower arm 142 of the linkage assembly 116, as described below. As to other aspects, the linkage assemblies 16, 116 are substantially similar.

In the illustrative embodiment, a commodity (e.g., seed or fertilizer) is stored in a hopper 24 and provided to a commodity meter 26, which releases the commodity for distribution to the underlying surface. In the illustrative embodiment, the commodity is distributed to a furrow formed in the soil by a furrow opener coupled to a central frame 14 of the main frame 61. The furrow opener includes at least one disk 30 configured to contact the underlying surface to form the furrow. In the illustrative embodiment, at least one gauge wheel 32 controls the depth of the furrow and is pivotably mounted to the central frame 14 via at least one strut 36. A closing wheel 33 is coupled to the central frame 14 and configured to close the furrow opened by the at least one disk 30 after the commodity is provided to the furrow.

Figure 2:
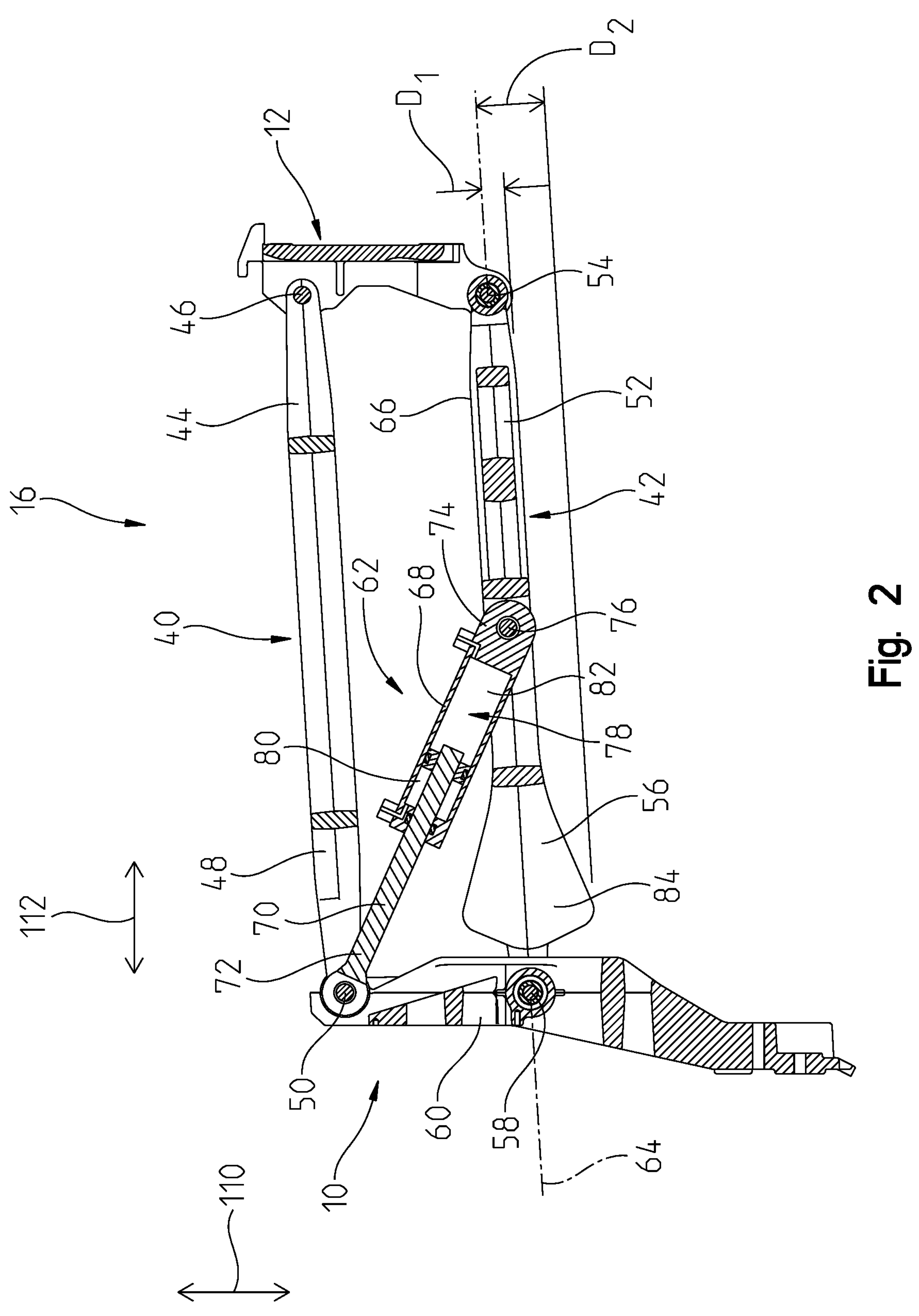
FIG. 2 is cross-sectional view of the linkage assembly of FIG. 1.

As shown in FIGS. 1-2, the linkage assembly 16 includes an upper arm 40 and the lower arm 42. In some embodiments, the upper arm 40 and lower arm 42 are parallel to one another at all times. The upper arm 40 includes a forward end 44 pivotably coupled to the toolbar 12 at a first coupling point 46 and a rearward end 48 pivotably coupled to the row unit 10 at a third coupling point 50. Similarly, the lower arm 42 includes a forward end 52 pivotably coupled to the toolbar 12 at a second coupling point 54 and a rearward end 56 pivotably coupled to the row unit 10 at a fourth coupling point 58. In the illustrative embodiment, the upper arm 40 and the lower arm 42 are each coupled to an upper frame 60 of the row unit 10. In the illustrative embodiment, the upper frame 60 is fixed relative to the central frame 14. In some embodiments, the upper frame 60 and the central frame 14 are both included in the main frame 61 of the row unit 10. In some embodiments, the upper frame 60 and the central frame 14 are single monolithic component of the row unit 10.

Figure 3:
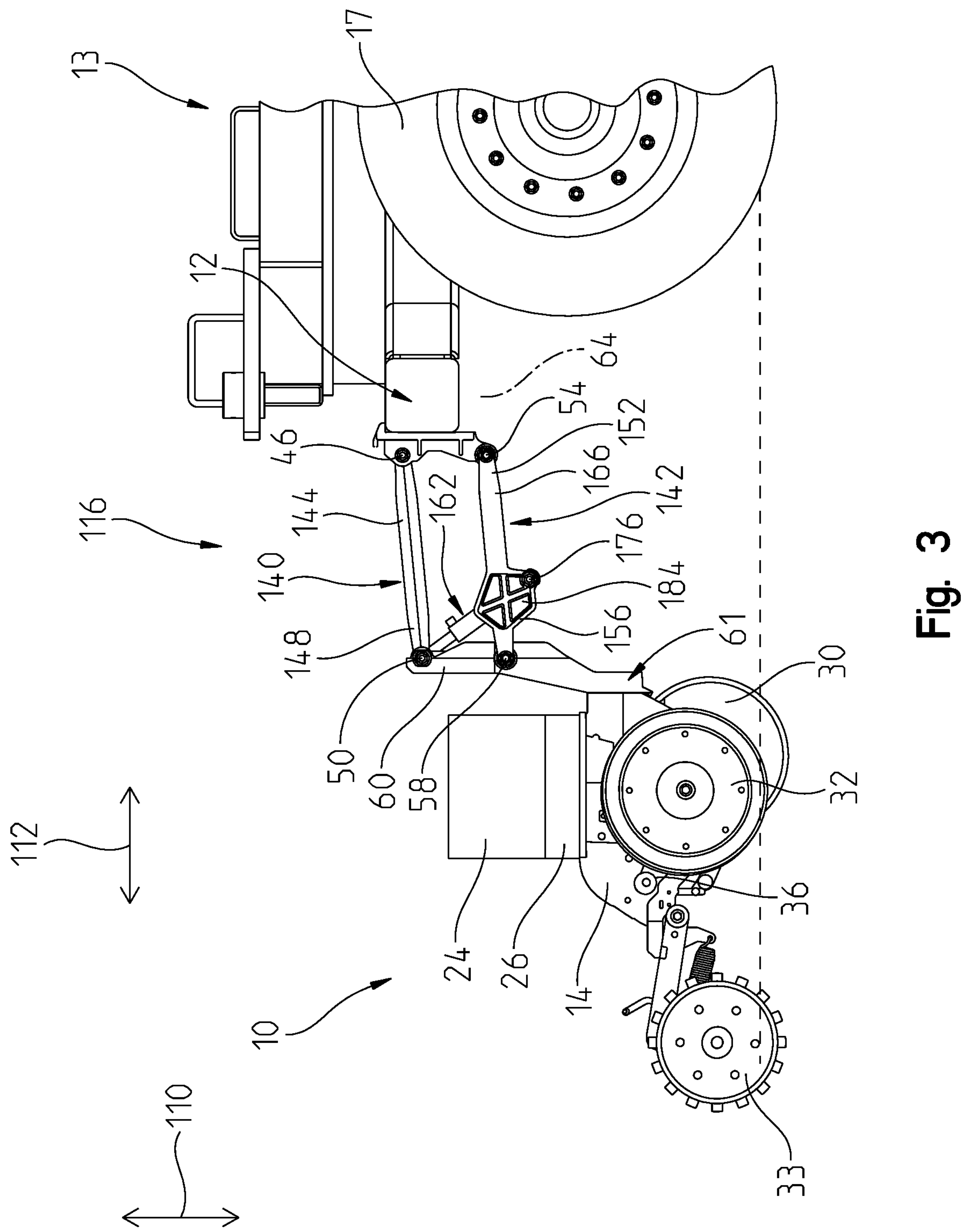
FIG. 3 is a side elevation view of the row unit of FIG. 1 moveably coupled to the toolbar of the planter of FIG. 1 via another linkage assembly, having a lesser length than the linkage assembly of FIG. 1.
Figure 4:
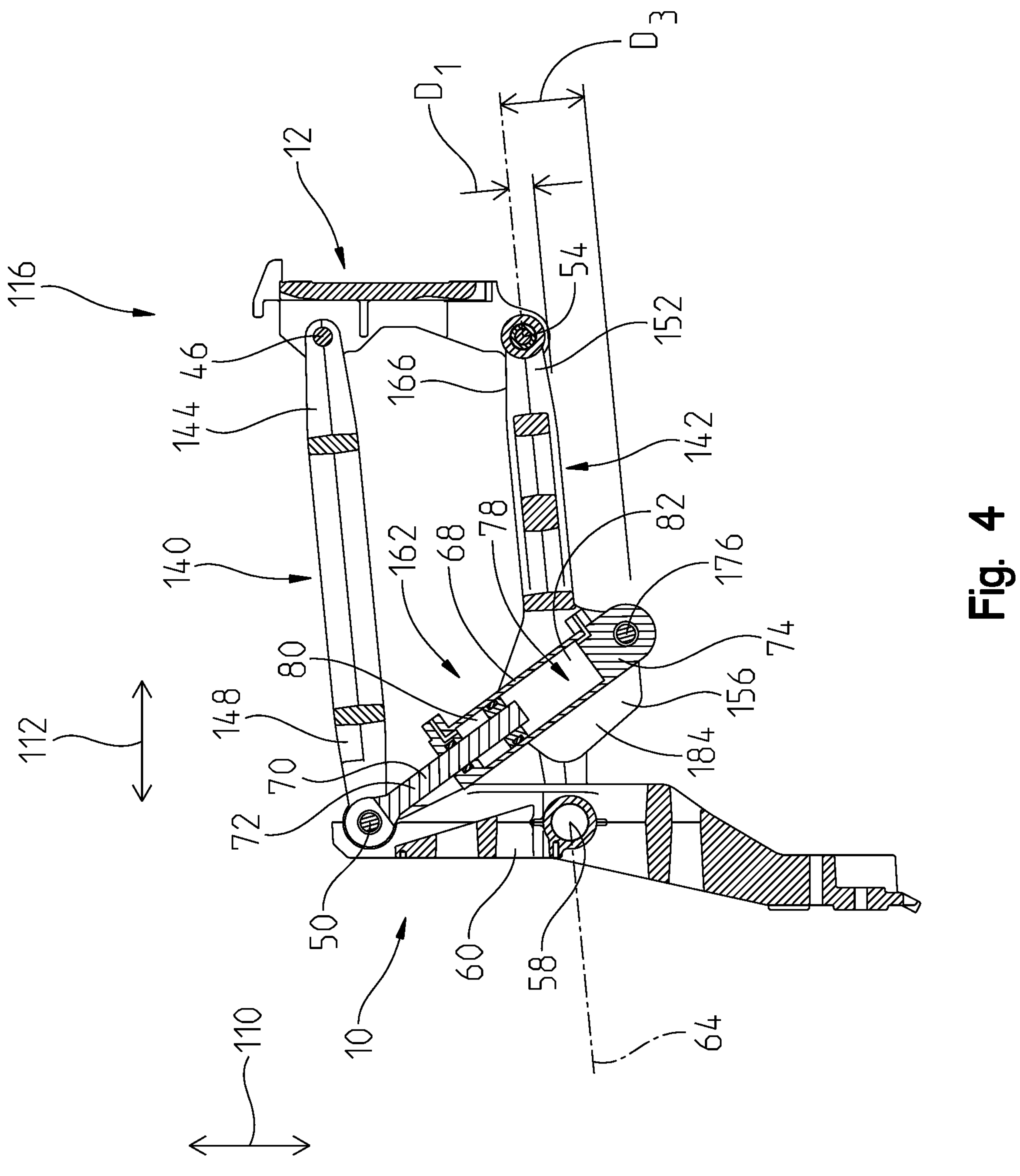
FIG. 4 is cross-sectional view of the linkage assembly of FIG. 3.

Referring now to FIGS. 3-4, the linkage assembly 116 includes an upper arm 140 and the lower arm 142. In some embodiments, the arms 140, 142 are parallel to one another at all times. The lower arm 142 includes a forward end 152 pivotably coupled to the toolbar 12 at the second coupling point 54 and a rearward end 156 pivotably coupled to the row unit 10 at the fourth coupling point 58. In the illustrative embodiment, the upper arm 140 and the lower arm 142 are each coupled to the upper frame 60 of the row unit 10.

As shown in FIGS. 1-4, the lower arm 42, 142 of each linkage assembly 16, 116 includes a longitudinal axis 64 extending therethrough. In the illustrative embodiments, a majority of the length (i.e., in the fore-aft direction 112) of each lower arm 42, 142 is symmetrical across opposite sides of the longitudinal axis 64. For example, the lower arms 42, 142 each include standard portions 66, 166, respectively, that are symmetrical across opposite sides of the longitudinal axis 64. In the illustrative embodiments, the standard portions 66, 166 each include the forward ends 52, 152 of the respective lower arms 42, 142.

In the illustrative embodiments, the longitudinal axis 64 of each lower arm 42, 142 is aligned with the second coupling point 54 and the fourth coupling point 58. What is meant by the longitudinal axis 64 being aligned with a coupling point is that when viewed in a side elevation view as shown in FIGS. 1 and 3 or a cross-sectional view as shown in FIGS. 2 and 4, the longitudinal axis 64 appears to intersect the coupling points 54, 58.

In the illustrative embodiment shown in FIGS. 1-2, the planter 13 includes the actuator 62 coupled to the linkage assembly 16. In the illustrative embodiment shown in FIGS. 3-4, the planter 13 includes the actuator 162 coupled to the linkage assembly 116. In the illustrative embodiments, the actuators 62, 162 are configured to retract to urge the row unit 10 downward relative to the underlying surface during an agricultural operation. In the illustrative embodiments, the actuators 62, 162 are configured to extend within a first range of motion (e.g., a first distance) to urge the row unit 10 upward away from the underlying surface during an agricultural operation and extend further, beyond the first range of motion (e.g., a second distance greater than the first distance), to move the row unit 10 into a stowed position for travel, which is independent of the agricultural operation. In the illustrative embodiments, due to the orientation of the actuators 62, 162 (e.g., position of a piston 70 relative to a cylinder 68), the force available to extend the actuators 62, 162 is greater than the force available to retract the actuators 62, 162.

Referring now to FIGS. 2 and 4, the actuators 62, 162 each include the cylinder 68 and the piston 70, which is positioned partially within the cylinder 68. The piston 70 is configured to move relative to the cylinder 68 during extension and retraction of each actuator 62, 162. In the illustrative embodiments, the actuators 62, 162 each include a first end 72 comprised by the piston 70 and a second end 74 comprised by the cylinder 68. The cylinder 68 includes a chamber 78 having a rod-side 80 configured to be pressurized to retract each actuator 62, 162 and a cylinder-side 82 configured to be pressurized to extend each actuator 62, 162.

As shown in FIGS. 1-4, the first end 72 of each actuator 62, 162 is pivotably coupled to the row unit 10 and corresponding upper arm 40, 140 at the third coupling point 50. In the illustrative embodiment shown in FIGS. 1-2, the second end 74 of the actuator 62 is pivotably coupled to the lower arm 42 at a fifth coupling point 76 that is located between the second coupling point 54 and the fourth coupling point 58. In the illustrative embodiment shown in FIGS. 3-4, the second end 74 of the actuator 162 is pivotably coupled to the lower arm 142 at a fifth coupling point 176 that is located between the second coupling point 54 and the fourth coupling point 58. It should be appreciated that referring to a fifth coupling point (e.g., 176) as being between the second coupling point 54 and the fourth coupling point 58 does not necessarily require vertical alignment of the fifth coupling point (e.g., 176) with the second coupling point 54 and the fourth coupling point 58. Between, in this context, means between in the fore-aft direction 112.

As shown in FIGS. 1-4, the cylinder-side 82 of each actuator 62, 162 is located between the respective fifth coupling point 76, 176 and the rod-side 80 of each actuator 62, 162. This arrangement allows for more force to be applied for extension of each actuator 62, 162 relative to retraction of each actuator 62, 162, which is important because, in some embodiments, movement of the row unit 10 to the stowed position requires more force than is needed for application of downforce to cause the row unit 10 to follow ground contours of the underlying surface.

As shown in FIGS. 1-4, the first end 72 of each actuator 62, 162 is positioned nearer to the row unit 10 than is the second end 74 of each actuator 62, 162 such that the actuator is sloped relative to the upper frame 60 of the row unit 10. In this sloped orientation, in some embodiments, each actuator 62, 162 is nearly parallel to the direction of an overall reaction force of the ground created as the row unit 10 moves along the underlying surface. This nearly parallel relationship reduces the variation in row unit downforce while the row unit 10 follows contours of the underlying surface during the agricultural operation. The row unit 10 moving through the soil in the fore-aft direction 112 creates a draft reaction force, and the weight of the row unit 10 and downforce in the vertical direction 110 applied by the row unit 10 creates a ground reaction force. The resultant force vector of the draft reaction force and the ground reaction force is referred to as the overall reaction force, and is nearly parallel with each actuator 62, 162. In some embodiments, nearly parallel means within 20 degrees. In some embodiments nearly parallel means within 10 degrees. In some embodiments nearly parallel means within 5 degrees.

Referring now to FIG. 2, the longitudinal axis 64 of the lower arm 42 is aligned with the fifth coupling point 76. The lower arm 42 comprises the standard portion 66 and a bumper portion 84, which includes the rearward end 56 of the lower arm 42. In the illustrative embodiment, the standard portion 66 extends above and below the longitudinal axis 64 a distance $D_1$. The bumper portion 84 is adjacent to the standard portion and extends above and below the longitudinal axis 64 a distance $D_2$ that is greater than the distance $D_1$. In the illustrative embodiment, as the row unit 10 pivots relative to the linkage assembly 16, the bumper portion 84 is configured to contact the upper frame 60 of the row unit 10 to limit pivoting movement of the row unit 10 relative to the linkage assembly 16. In the illustrative embodiment, the fifth coupling point 76 is located on the standard portion 66 of the lower arm 52.

Referring now to FIGS. 3-4, the lower arm 142 comprises the standard portion 166 and a bumper portion 184, which includes the rearward end 156 of the lower arm 142. In the illustrative embodiment, the standard portion 166 extends above and below the longitudinal axis 64 the distance $D_1$.

The bumper portion 184 is adjacent to the standard portion and extends below the longitudinal axis 64 a distance $D_3$ that is greater than the distance $D_1$. In the illustrative embodiment, as the row unit 10 pivots relative to the linkage assembly 116, the bumper portion 184 is configured to contact the upper frame 60 of the row unit 10 to limit pivoting movement of the row unit 10 relative to the linkage assembly 116. As shown in FIGS. 3-4, in the illustrative embodiment, the fifth coupling point 176 is located on the bumper portion 184 and is below the longitudinal axis 64 of the lower arm 162. As such, the longitudinal axis 64 of the lower arm 142 is not aligned with the fifth coupling point 176. What is meant by the longitudinal axis 64 being not aligned with the fifth coupling point 176 is that when viewed in a side elevation view as shown in FIG. 3 or a cross-sectional view as shown in FIG. 4, the longitudinal axis 64 appears to not intersect the coupling point 176. Referring again to FIGS. 3-4, the fifth coupling point 176 is positioned nearer to the fourth coupling point 58 than to the second coupling point 54.

This disclosure contemplates other embodiments wherein the downforce actuator associated with the row unit 10 (e.g., actuator 62, 162) is nearly parallel or otherwise sloped similarly to the overall reaction force applied to the row unit 10 during an agricultural operation. For example, in some embodiments, a first end of a downforce actuator associated with the row unit 10 may be pivotably coupled to the row unit 10 (e.g., the upper frame 60) at a location that is spaced apart from the third coupling point 50 while the second end of the downforce actuator is pivotably coupled to the lower arm 42 at a location between the second coupling point 54 and the fourth coupling point 58. In other words, in some embodiments, the first end of the actuator (e.g., actuator 62, 162) is not pivotably coupled (nor otherwise directly coupled) to the upper arm. In some embodiments, the first end of the actuator (e.g., actuator 62, 162) is pivotably coupled to the row unit 10 at a location that is between the third coupling point 50 and the fourth coupling point 58. In some embodiments, the first end of the actuator (e.g., actuator 62, 162) is pivotably coupled to the row unit 10 at a location that is nearer to the third coupling point 50 than to the fourth coupling point 58.

In use, a method of moving the row unit 10 includes moving the planter over underlying soil during an agricultural operation such that a linkage assembly (e.g., linkage assembly 16, 116) coupled between the toolbar 12 and the row unit 10 pivots relative to the toolbar 12 and the row unit 10. Further, the method includes retracting an actuator (e.g., actuator 62, 162) to urge the row unit 10 downward relative to the underlying surface during the agricultural operation. Further, the method includes extending the actuator (e.g., actuator 62, 162) a first distance during the agricultural operation to lessen the downward force of the row unit 10. Further, the method includes, subsequent to the agricultural operation, extending the actuator (e.g., actuator 62, 162) a second distance to move the row unit 10 to a stowed position for travel. In some embodiments, extending the actuator (e.g., actuator 62, 162) the second distance subsequent to the agricultural operation includes applying more force than retracting the actuator (e.g., actuator 62, 162) during the agricultural operation.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A planter for use in an agricultural operation comprising:

a toolbar supported above an underlying surface;

a row unit coupled to the toolbar and configured to distribute commodity to the underlying surface;

a linkage assembly including an upper arm and a lower arm positioned below the upper arm, the upper arm including a forward end pivotably coupled to the toolbar at a first coupling point and a rearward end pivotably coupled to the row unit at a third coupling point, and the lower arm including a forward end pivotably coupled to the toolbar at a second coupling point and a rearward end pivotably coupled to the row unit at a fourth coupling point; and an actuator including a first end pivotably coupled to the row unit and the upper arm at the third coupling point and a second end pivotably coupled to the lower arm at a fifth coupling point located between the second coupling point and the fourth coupling point;

wherein the actuator is configured to retract to urge the row unit downward relative to the underlying surface.

2. The planter of claim 1, wherein the actuator includes a cylinder and a piston positioned partially within the cylinder and configured to move relative to the cylinder during extension and retraction of the actuator.

3. The planter of claim 2, wherein the piston is coupled to both the row unit and the upper arm at the third coupling point and the cylinder is coupled to the lower arm at the fifth coupling point.

4. The planter of claim 2, wherein the cylinder includes a chamber having a rod-side configured to be pressurized to retract the actuator and a cylinder-side configured to be pressurized to extend the actuator; and wherein the cylinder-side is located between the fifth coupling point and the rod-side.

5. The planter of claim 1, wherein upper arm and the lower arm are parallel to each other at all times during the agricultural operation.

6. The planter of claim 1, wherein the lower arm includes a longitudinal axis that extends therethrough and is aligned with the second coupling point and the fourth coupling point.

7. The planter of claim 6, wherein a majority of a length of the lower arm is symmetrical across opposite sides of the longitudinal axis.

8. The planter of claim 6, wherein the longitudinal axis is aligned with the fifth coupling point.

9. The planter of claim 6, wherein the longitudinal axis is not aligned with the fifth coupling point.

10. The planter of claim 9, wherein the fifth coupling point is positioned below the longitudinal axis.

11. The planter of claim 1, wherein the lower arm includes a standard portion extending below the longitudinal axis a first distance and a bumper portion adjacent to the standard portion and extending below the longitudinal axis a second distance that is greater than the first distance; and wherein the bumper portion is configured to contact the row unit to limit pivoting movement of the row unit relative to the linkage assembly.

12. The planter of claim 11, wherein the fifth coupling point is located on the bumper portion.

13. The planter of claim 1, wherein the fifth coupling point is positioned nearer to the fourth coupling point than to the second coupling point.

14. The planter of claim 1, wherein the row unit includes a main frame to which the linkage assembly is coupled; and wherein the row unit includes at least one disk coupled to the main frame and configured to form a furrow in the underlying surface that receives the commodity distributed by the row unit.

15. The planter of claim 1, wherein the actuator is configured to extend to urge the row unit upward away from the underlying surface into a position for travel independent of the agricultural operation.

16. The planter of claim 1, wherein the force available to extend the actuator is greater than the force available to retract the actuator.

17. A planter for use in an agricultural operation comprising:

a toolbar supported above an underlying surface;

a row unit coupled to the toolbar and configured to distribute commodity to the underlying surface;

a linkage assembly including an upper arm and a lower arm positioned below the upper arm, the upper arm including a forward end pivotably coupled to the toolbar at a first coupling point and a rearward end pivotably coupled to the row unit at a third coupling point, and the lower arm including a forward end pivotably coupled to the toolbar at a second coupling point and a rearward end pivotably coupled to the row unit at a fourth coupling point; and an actuator including a first end pivotably coupled to the row unit and a second end pivotably coupled to the lower arm at a fifth coupling point located between the second coupling point and the fourth coupling point;

wherein the actuator is configured to retract to urge the row unit downward relative to the underlying surface; and wherein the first end of the actuator is pivotably coupled to the row unit at a location that is nearer to the third coupling point than to the fourth coupling point.

18. The planter of claim 17, wherein the first end of the actuator is pivotably coupled to the upper arm.

19. A planter for use in an agricultural operation comprising:

a toolbar supported above an underlying surface;

a row unit coupled to the toolbar and configured to distribute commodity to the underlying surface;

a linkage assembly including an upper arm and a lower arm positioned below the upper arm, the upper arm including a forward end pivotably coupled to the toolbar at a first coupling point and a rearward end pivotably coupled to the row unit at a third coupling point, and the lower arm including a forward end pivotably coupled to the toolbar at a second coupling point and a rearward end pivotably coupled to the row unit at a fourth coupling point; and an actuator including a first end pivotably coupled to the row unit and a second end pivotably coupled to the lower arm at a fifth coupling point located between the second coupling point and the fourth coupling point;

wherein the actuator is configured to retract to urge the row unit downward relative to the underlying surface; and wherein the first end of the actuator is pivotably coupled to the upper arm.

* * * * *